(12) United States Patent
Hsu et al.

(10) Patent No.: US 8,345,684 B2
(45) Date of Patent: Jan. 1, 2013

(54) NETWORK LINKING DEVICE AND METHOD FOR TRANSFERRING DATA PACKETS BY THE SAME

(75) Inventors: Wiley Hsu, Taipei (TW); Vic Chen, Taipei (TW); Johnnyti Wu, Taipei (TW)

(73) Assignee: Via Technologies, Inc., Taipei (TW)

( * ) Notice: Subject to any disclaimer, the term of this patent is extended or adjusted under 35 U.S.C. 154(b) by 3550 days.

(21) Appl. No.: 10/308,687

(22) Filed: Dec. 3, 2002

(65) Prior Publication Data

US 2003/0227928 A1 Dec. 11, 2003

(30) Foreign Application Priority Data

Jun. 6, 2002 (TW) .............................. 91112229 A

(51) Int. Cl.
*H04L 12/56* (2006.01)
(52) U.S. Cl. ........ 370/392; 370/389; 370/466; 709/221; 709/232
(58) Field of Classification Search .................. 370/389, 370/392, 393, 395.1, 395.31, 395.5, 395.52, 370/395.54, 395.6, 401, 466; 709/221–223
See application file for complete search history.

(56) References Cited

U.S. PATENT DOCUMENTS

| | | | | |
|---|---|---|---|---|
| 5,467,452 A * | 11/1995 | Blum et al. | ...................... | 709/244 |
| 5,568,617 A * | 10/1996 | Kametani | ...................... | 710/100 |
| 5,761,507 A * | 6/1998 | Govett | .......................... | 718/101 |
| 5,802,278 A * | 9/1998 | Isfeld et al. | .................... | 709/249 |
| 5,933,627 A * | 8/1999 | Parady | .......................... | 712/228 |
| 5,937,187 A * | 8/1999 | Kosche et al. | ................ | 718/104 |
| 6,356,548 B1 * | 3/2002 | Nellenbach et al. | .......... | 370/362 |
| 6,404,752 B1 * | 6/2002 | Allen et al. | ..................... | 370/335 |
| 6,424,659 B2 * | 7/2002 | Viswanadham et al. | ....... | 370/469 |
| 6,647,004 B2 * | 11/2003 | Allen et al. | ..................... | 370/335 |
| 6,985,431 B1 * | 1/2006 | Bass et al. | ........................ | 370/60 |
| 6,985,441 B1 * | 1/2006 | Acharya | ......................... | 370/231 |
| 7,126,952 B2 * | 10/2006 | Hooper et al. | ................ | 370/401 |
| 7,185,184 B1 * | 2/2007 | Nie | ................................ | 712/225 |
| 7,324,547 B1 * | 1/2008 | Alfieri et al. | ................... | 370/461 |
| 7,328,289 B2 * | 2/2008 | Wolrich et al. | ................ | 710/100 |
| 7,424,579 B2 * | 9/2008 | Wheeler et al. | ............... | 711/151 |
| 7,433,307 B2 * | 10/2008 | Hooper et al. | ................ | 370/231 |

* cited by examiner

*Primary Examiner* — Hassan Phillips
*Assistant Examiner* — Mark A Mais
(74) *Attorney, Agent, or Firm* — Evan R. Witt; Kirton McConkie

(57) ABSTRACT

A network linking device in communication with a computer host and an external network is disclosed. The network linking device includes a media access controller (MAC), a buffer and a feature value evaluator. The MAC in communication with the external network receives a data packet from the external network, and stores the data packet in the buffer in communication therewith. The feature value evaluator in communication with the buffer determines whether the data packet complies with a transfer condition according to a feature value included in the data packet, and actuates the MAC to assert an interrupt signal to the computer host when the feature value indicates the data packet complies with the transfer condition. A method for transferring a data packet between a computer host and an external network is also disclosed.

18 Claims, 3 Drawing Sheets

NETWORK LINKING DEVICE AND METHOD FOR TRANSFERRING DATA PACKETS BY THE SAME

FIELD OF THE INVENTION

The present invention relates to a network linking device, and more particularly to a network linking device in communication with a computer host and an external network. The present invention also relates to a method for transferring data packets between a computer host and an external network via a network linking device.

BACKGROUND OF THE INVENTION

Please refer to FIG. 1 which is a schematic block diagram illustrating an internal structure of a personal computer in communication with an external network. The personal computer includes a microprocessor 10, a north bridge chip 11, a south bridge chip 12, a memory 111 and a network interface card 121. The memory 111 is coupled to the north bridge chip 11. The network interface card 121 is coupled to the north bridge chip 11 via a peripheral component interconnect (PCI) bus. The network interface card 121 includes a media access controller (MAC) 1211 and a physical layer device (PHY) 1212. In some configurations, the MAC 1211 could be directly integrated into the south bridge chip 12. The PHY 1212 is used for connecting to an external network.

When tranceiving data packets, the MAC 1211 asserts an interrupt signal to the microprocessor 10 for interrupting hardware. The microprocessor 10 suspends the performing work to deal with an interrupt service routine (ISR) in the driver for the MAC 1211.

Conventionally, the MAC 1211 asserts an interrupt signal according to one of the following manners:
1. a packet-based manner, i.e. asserting a hardware interrupt signal whenever a data packet or a predetermined number of data packets to be transmitted;
2. a time-based manner, i.e. asserting a hardware interrupt signal periodically; or
3. a hybrid manner, i.e. combining the above packet- and time-based manners.

For the packet-based manner, the data packets can be timely picked up by the operating system, and the occupied memory resource is efficiently released. When the data packet throughput in the network is high, however, the frequently generated interrupt signals will result in that the operation resource of the microprocessor 10 is highly occupied by the network linking device so as to adversely affect the performance of the system.

On the other hand, for the time-based manner, the data packets can be processed to release the occupied memory resource without disturbing the microprocessor 10 too much. Once the data packet throughput is low, however, data packets must wait much longer to be transferred in response to the interruption, and the data packets cannot be efficiently transferred to the operating system.

For the hybrid manner, it is necessary to regulate the timing for asserting the interrupt signal to transfer data packets according to the data packet throughput. In practice, however, it is hard to control the timing for the MAC 1211 to assert the hardware interrupt signal since it is hard to predict the data packet throughput.

As described above, the assertion of the interrupt signal is either packet-based or time-based. For a situation that a data file includes a plurality of data packets and the data packets transmitted sequentially in response to the interrupt signal do not include the last packet of the data file, the microprocessor 10, although having been interrupted, will not notify the operating system to pick up the data packets. In stead, the data packets will be buffered in the memory. The occupied memory will not be released until the complete data file including the last packet is received. Meanwhile, the microprocessor 10 resumes the proceeding thread suspended due to the interruption. In other words, the interruption of the microprocessor 10, in spite of occupying the operation resource of the microprocessor 10, does not result in the release the occupied memory resource under this circumstance.

With the popularization of the broadband network, the data flow through the MAC 1211 increases a lot, and thus the interrupt frequency to the microprocessor 10 increases. The above-mentioned problem that the operation resource of the microprocessor 10 is unduly occupied is even serious. Especially for a server that cooperates with a plurality of terminals in a network system, several network interface cards (NICs) are required in the server to expand its bandwidth. If the network interface cards generate the interrupt signals in a manner as above, the performance of the server will be reduced due to frequent hardware interruption, and a hang-up situation may even occur.

Therefore, the purpose of the present invention is to contemplate how to assert the interrupt signal at proper timing.

SUMMARY OF THE INVENTION

An object of the present invention is to provide a network linking device and a method for transferring data packets to assert the interrupt signal properly for avoiding deterioration of the server performance.

According to an aspect of the present invention, there is provided a network linking device in communication with a computer host and an external network. The network linking device includes a media access controller (MAC), a buffer and a feature value evaluator. The MAC in communication with the external networkreceives a data packet from the external network, and the buffer in communication with the MAC stores the data packet therein. The feature value evaluator in communication with the buffer determines whether the data packet complies with a transfer condition according to a feature value included in the data packet and actuates the MAC to assert an interrupt signal to the computer host when the feature value indicates the data packet complies with the transfer condition, thereby allowing the computer host to perform a corresponding interrupt service for the transfer of the data packet from the buffer in response to the interrupt signal.

For example, the buffer can be a static random access memory (SRAM).

Preferably, the feature value evaluator is a microprocessor.

In an embodiment, the transfer condition is complied with when the data packet is the one required to be transferred immediately upon being received by the MAC.

In another embodiment, the transfer condition is complied with when the data packet is the last one of a plurality of associated data packets to be transferred together.

Preferably, the network linking device further includes a flash memory in communication with the feature value evaluator for storing therein program codes and initial data required for the operation of the feature value evaluator.

Preferably, the feature value is one of a destination address (DA) of the data packet, a data type of the data packet, a specified content of the data packet, or a combination thereof. The specified content of the data packet is preferably one of a hardware type, a protocol type, a target Internet protocol (IP), a target hardware address (HA), a flag, a code bit or a combination thereof.

According to another aspect of the present invention, there is provided a network linking device in communication with a computer host and an external network. The network linking device includes a media access controller (MAC), a buffer and a feature value evaluator. The MAC in communication with the external network receives a data packet from the external network, and stores the packet in the buffer in communication therewith. The feature value evaluator in communication with the buffer determines whether the data packet complies with a transfer condition according to a feature value of the data packet and allows the data packet to be transferred along with an associated data packet from the buffer when the feature value indicates the data packet complies with the transfer condition.

Preferably, the data packet is determined to comply with the transfer condition when the data packet is the last packet of a data file. Meanwhile, the associated data packet is one of the data file preceding the last packet.

According to another aspect of the present invention, there is provided a method for transferring a data packet between a computer host and an external network. The method comprising steps of receiving a data packet from the external network, storing the data packet in a buffer, determining whether the data packet complies with a transfer condition according to a feature value of the data packet, and performing an interrupt service by the computer host to transfer the data packet out of the buffer when the feature value indicates the data packet complies with the transfer condition.

Generally, the data packet is transferred between the computer host and the external network via a media access controller (MAC), and the buffer is in communication with the MAC.

Preferably, the interrupt service is performed by the computer host in response to an interrupt signal asserted by the MAC upon the data packet complies with the transfer condition.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
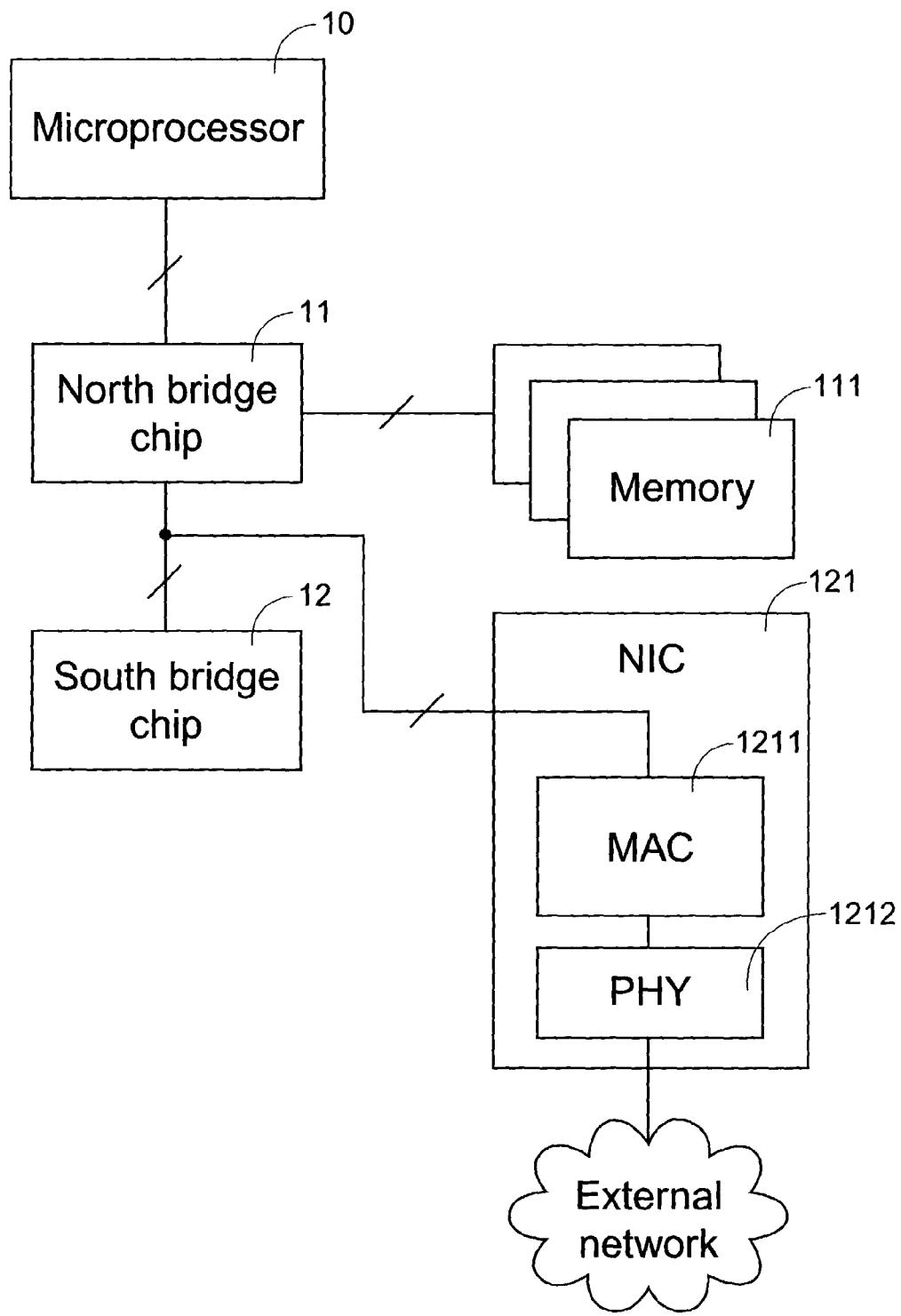
FIG. 1 is a schematic block diagram illustrating a typical internal structure of a personal computer in communication with an external network.
Figure 2:
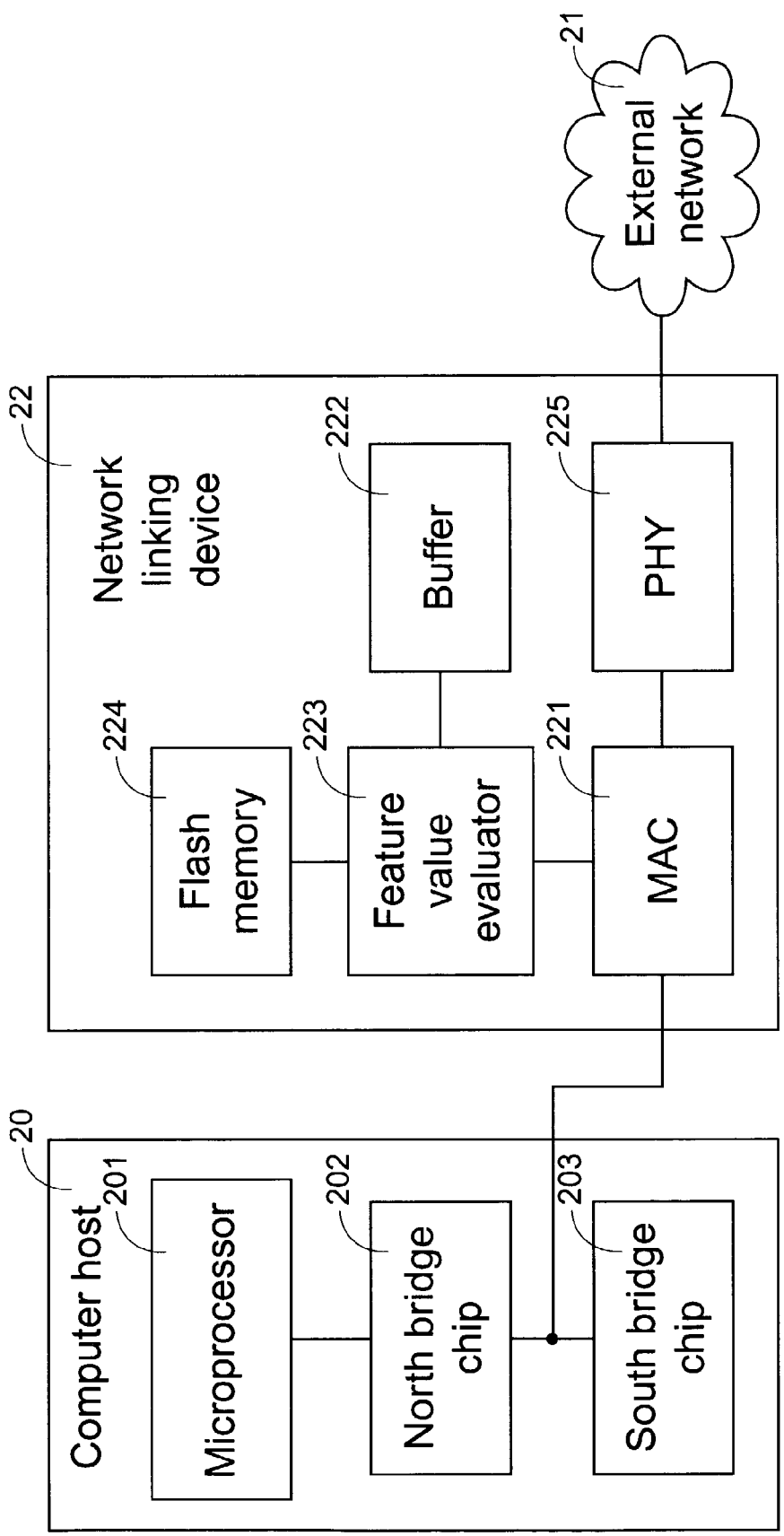
FIG. 2 schematically shows a network linking device working with a computer host according to a preferred embodiment of the present invention.

Please refer to FIG. 2 which is a block diagram illustrating a preferred embodiment of a network linking device in communication with a computer host and an external network according to the present invention. As shown in FIG. 2, a computer host 20 includes a microprocessor 201, a north bridge chip 202 and a south bridge chip 203, and a network linking device 22 includes a media access controller (MAC) 221, a buffer 222, a feature value evaluator 223, a nonvolatile memory such as an electrically erasable programmable read-only memory (EEPROM) or a flash memory 224, and a physical layer device (PHY) 225. The network linking device 22 is coupled to the north bridge chip 202 of the computer host 20 via the MAC 221 and to an external network 21 via the PHY 225. The network linking device 22 receives the data packet from the computer host 20 via the MAC 221 or from the external network 21 via the PHY 225 and stores the data packet in the buffer 222, e.g. a static random access memory (SRAM). Subsequently, the feature value evaluator 223, e.g. a microprocessor, extracts a feature value of the data packet to determine whether the data packet should be transferred or not. The flash memory 224 coupled to the feature value evaluator 223 stores the required firmware code and initial settings for activating the network linking device 22. In addition, in some configurations, the MAC 221 could be integrated into the south bridge chip 203, or mounted on a network interface card.

For example, the feature value can be a destination address (DA) of the data packet, a data type of the data packet and/or a protocol content of the third network layer in the data packet. The protocol content associated with the third network layer, for example, includes an address resolution protocol (ARP) packet, an Internet protocol (IP) fragment, and a transmission control protocol/Internet protocol (TCP/IP). They could be parsed through a hardware type, a protocol type, a target IP, a target hardware address (HA), a flag and/or a code bit.

There are two transfer conditions in this embodiment. A data packet may require to be transferred immediately once being received in view of its packet format. Another example is that the data packet is one of a plurality of packets of a data file, so the data packet should be transferred along with the whole associated data packets.

For the former transfer condition, i.e. when the received data packet requires to be transferred immediately, the feature value evaluator 223 checks whether the destination address (DA), the data type and/or the third network layer protocol content of the data packet are correct and complete. The feature value evaluator 223 commands the MAC 221 to assert the interrupt signal to the microprocessor 201 of the computer host 20. The microprocessor 201 performs a corresponding interrupt service in response to the interrupt signal for allowing the operating system (OS) to transfer the data packet, which is received by the MAC 221 and stored in the buffer 222, to the computer host 20 and free the occupied memory resource.

The following is an exemplified transfer condition for an Ethernet packet. The data packet includes a DA field of the packet, a data type field of the packet, and an ARP content of the packet. The ARP content includes the types of hardware, protocol, target IP and target HA of the packet. The feature value evaluator 223 obtains the DA of the data packet. When the data type of the data packet is observed to be "0806", it means that the data packet is one required to be transferred immediately. Then, the packet content associated with the third network layer is checked. The data packet will be transmitted when the packet content is correct and complete.

For the latter transfer condition as mentioned above, i.e. when a data file is to be transferred as a whole, and the data packet is the last one of the data file, the microprocessor 201 of the computer host 20 will not inform the operating system to pick up the data file until the incoming data packet is the last packet and is received completely. On the contrary, if the data packet is not the last one of the data file, the transfer condition is not complied with, and then the data packet is temporarily stored in the buffer 222 till the last packet of the data file is received and detected by the feature value evaluator 223.

An example of such transfer condition for an Internet protocol (IP) packet is given as follows. As is known, for an IP packet, individual data packets are meaningless to the computer host unless they are combined into a complete information file. In other words, the individual packets are not to be transferred until all the packets of the entire information file are received together. The feature value evaluator 223 checks the DA, the data type and the flags of the IP header of the data packet to determine whether the information file is complete or not.

For example, when the data type is "0800", it is determined by the feature value evaluator 223 that the data packet should be transferred along with the other packets of the same information file. When the flag is further checked to be "001", it represents that the data packet is not the last one of the data file, and should be stored in the buffer 222 first. When the flag of an incoming packet is "000", which represents that the data packet is the last one of the data file, the data packet and the associated data packet(s) previously stored in the buffer are transferred to the computer host 20 together.

A transmission control protocol (TCP) packet is further exemplified herein to describe the present invention. The TCP packet has a format similar with that of the IP packet. Accordingly, the data type is supposed to be "0800". In this example, code bits, instead of flags, of the TCP header are used to determine whether the data packet is the last one. When the last one of the code bits is "0", it represents that the data packet is not the last one of the data file, and should wait for the last packet in the buffer 222 to be transferred together. On the contrary, if the last one of the code bits is "1", it represents that the data packet is the last packet and the whole data file can be transferred by asserting the interrupt signal.

Figure 3:
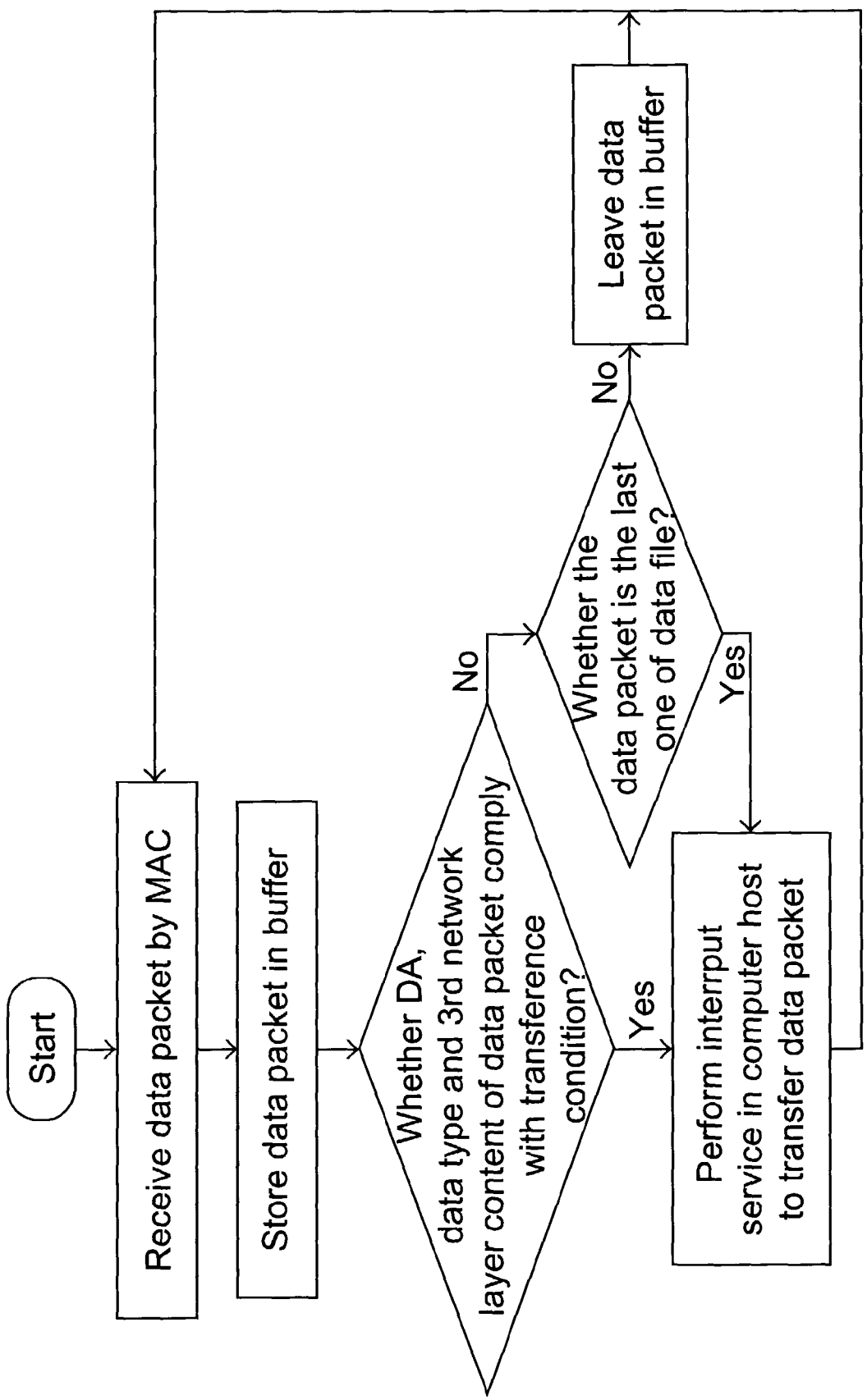
FIG. 3 is a flowchart illustrating a method for transferring a data packet between a computer host and an external network according to a preferred embodiment of the present invention.

The examples of aforementioned interrupt timing are summarized in the flowchart of FIG. 3. First of all, the data packet from the computer host or the external network is received by a MAC and stored in a buffer. Subsequently, the destination address (DA), the data type and the third network layer contents of the data packet are read and parsed by a feature value evaluator to determine whether the data packet complies with a transfer condition or not. When the data packet complies with the transfer condition, the interrupt signal is asserted from the MAC to the computer host to perform an interrupt service, e.g. informing the operating system to transfer the stored data packet(s) to the computer host. On the other hand, the data packet keeps staying in the buffer when the transfer condition is not complied with.

According to the present invention, the interrupt signal is dynamically asserted to free the memory capacity of the buffer when the buffer is almost exhausted by the stored data packets, even if the incoming data packet does not comply with the transfer condition. Under this circumstance, the interrupt signal is dynamically asserted according to the throughput of the MAC.

To sum up, the network linking device and method according to the present invention allows the interrupt signal to be asserted more properly by discriminating whether the incoming data packet complies with the transfer condition. Therefore, the system can be normally and efficiently operated. Especially for a server including several network interface cards (NICs), the performance will be significantly improved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A network linking device in communication with a computer host and an external network, comprising:
    a media access controller (MAC) in communication with said external network for receiving a data packet from said external network;
    a buffer in communication with said MAC for storing said data packet; and
    a feature value evaluator in communication with said buffer, determining whether said data packet complies with a transfer condition according to a feature value included in said data packet, wherein said MAC asserts an interrupt signal to said computer host when said feature value indicates said data packet complies with said transfer condition, thereby allowing said computer host to perform a corresponding interrupt service to transfer said data packet from said buffer in response to said interrupt signal, and holds off said interrupt signal when said feature value indicates said data packet does not comply with said transfer condition.

2. The network linking device according to claim 1 wherein said buffer is a static random access memory (SRAM).

3. The network linking device according to claim 1 wherein said feature value evaluator is a microprocessor.

4. The network linking device according to claim 1 wherein said transfer condition is complied with when said data packet is required to be transferred immediately upon being received by said MAC.

5. The network linking device according to claim 1 wherein said transfer condition is complied with when said data packet is a last one of a plurality of associated data packets to be transferred together.

6. The network linking device according to claim 1 further comprising a flash memory in communication with said feature value evaluator for storing therein program codes and initial data required for the operation of said feature value evaluator.

7. The network linking device according to claim 1 wherein said feature value is selected from a group consisting of a destination address (DA) of said data packet, a data type of said data packet, a specified content of said data packet, and a combination thereof.

8. The network linking device according to claim 7 wherein said specified content of said data packet is selected from a group consisting of a hardware type, a protocol type, a target internet protocol (IP), a target hardware address (HA), a flag, a code bit and a combination thereof.

9. A network linking device in communication with a computer host and an external network, comprising:
    a media access controller (MAC) in communication with said external network for receiving a data packet from said external network;
    a buffer in communication with said MAC for storing said data packet; and
    a feature value evaluator in communication with said buffer, determining whether said data packet complies with a transfer condition according to a feature value of said data packet, wherein said data packet is transferred along with an associated data packet from said buffer when said feature value indicates said data packet complies with said transfer condition, and suspends from being transferred when said feature value indicates said data packet does not comply with said transfer condition.

10. The network linking device according to claim 9 wherein said data packet is determined to comply with said transfer condition when said data packet is a last packet of a data file.

11. The network linking device according to claim 10 wherein said associated data packet is one of said data file preceding said last packet.

12. A method for transferring a data packet between a computer host and an external network, said method comprising steps of:
  receiving a data packet from said external network;
  storing said data packet in a buffer; determining whether said data packet complies with a transfer condition according to a feature value of said data packet; and
  transferring said data packet out of said buffer and a Media Access Controller (MAC) performing an interrupt service for said data packet by said computer host when said feature value indicates said data packet complies with said transfer condition, and
  holding off said interrupt service when said data packet does not comply with said transfer condition.

13. The method according to claim 12 wherein said data packet is transferred between said computer host and said external network via said media access controller (MAC), and said buffer is in communication with said MAC.

14. The method according to claim 13 wherein said interrupt service is performed by said computer host in response to an interrupt signal asserted by said MAC upon said data packet complies with said transfer condition.

15. The method according to claim 12 wherein said transfer condition is complied with when said data packet is required to be transferred immediately upon being received or when said data packet is a last packet of a plurality of associated data packets to be transferred together.

16. The method according to claim 15 wherein said transfer condition is not complied with when said data packet is not required to be transferred immediately upon being received and said data packet is not a last packet of a plurality of associated data packets to be transferred together.

17. The method according to claim 12 wherein said feature value is selected from a group consisting of a destination address (DA) of said data packet, a data type of said data packet, and a specified content of said data packet.

18. The method according to claim 17 wherein said specified content of said data packet is selected from a group consisting of a hardware type, a protocol type, a target Internet protocol (IP), a target hardware address (HA), a flag, and a code bit.

* * * * *